United States Patent [19]
Kahn et al.

[11] Patent Number: 5,838,665
[45] Date of Patent: Nov. 17, 1998

[54] DATA NETWORK TELEPHONE ADAPTOR DEVICE

[75] Inventors: Simon M. Kahn; Alan P. Haber, both of Jerusalem, Israel

[73] Assignee: Integrated Technology, Inc., Teaneck, N.J.

[21] Appl. No.: 613,509

[22] Filed: Mar. 11, 1996

[51] Int. Cl.[6] .......................... H04L 12/16; H04Q 11/00; H04M 3/42
[52] U.S. Cl. ........................ 370/260; 370/265; 370/352; 379/158; 379/202; 379/93.16
[58] Field of Search .............................. 379/93.07, 93.09, 379/93.11, 93.05, 93.14, 93.31, 93.33, 163, 67, 93.21, 158, 202, 203, 204, 93.16; 370/352, 402, 420, 395, 389, 390, 392, 383, 401, 206, 207, 286, 260, 261, 265, 264

[56] References Cited

U.S. PATENT DOCUMENTS

| | | | |
|---|---|---|---|
| 5,473,676 | 12/1995 | Frick et al. | 379/93.09 |
| 5,521,942 | 5/1996 | Betts et al. | 375/295 |
| 5,553,122 | 9/1996 | Haber et al. | 379/93.09 |
| 5,661,718 | 8/1997 | Bremer et al. | 370/286 |

OTHER PUBLICATIONS

Weinstein, C., et al. "Experience with Speech Communication in Packet Networks." IEEE Journal on Selected Areas in Communications, vol. SAC–1, No. 6, Dec. 1983.
Baran, P., "On Distributed Communications Networks." IEEE Transactions on Communications Systems, Mar. 1964.

Primary Examiner—Wellington Chin
Assistant Examiner—Melissa Kay Carman
Attorney, Agent, or Firm—Edward Langer

[57] ABSTRACT

An Internet/telephone adaptor device to link a regular telephone call with an Internet call without requiring software that is specific to each proprietary encoding scheme. The device is designed to operate with a data network terminal haling audio/data conversion means for reversibly converting voice signals to a data format for telephone-like communication over a data network. In a preferred embodiment, the adaptor device is provided as an add-on accessory to existing computer terminals having a sound card, making them capable of handling Internet calls. The adaptor is connected both to the computer and to the telephone line, enabling linkage of regular and Internet calls. With the adaptor device, a user can easily arrange conference calls between Internet users and telephone line users. A hold call feature is also provided to simplify user handling of calls.

14 Claims, 3 Drawing Sheets

DATA NETWORK TELEPHONE ADAPTOR DEVICE

FIELD OF THE INVENTION

The present invention relates to equipment for regular telephones and computer communications, and more particularly, to an Internet voice communication adaptor for interconnecting them.

BACKGROUND OF THE INVENTION

The telephone has become the mainstay of business and personal communication. Telephone calls, both domestic and international, are on the rise, and enormous sums are constantly being invested in further infrastructure development.

The information superhighway, known as the Internet, was developed in the US to allow collaboration between researchers working with computers in separate locations. The rapid expansion of the Internet has quickly made it the most widely used means for data communication throughout the world. Using the Internet, the cost of data communications has dropped to an insignificance, with the largest cost factor being the local telephone line access charges to the nearest Internet server location.

In 1995, Vocaltec of Herzliya, Israel introduced a method for making telephone-like calls on the Internet, using a sound card in the computer. The caller's voice is digitized via the sound card, and then sent by electronic mail (E-mail) using a standard modem over the Internet. The call is received on the other end as E-mail using a modem, and it is reorganized by software as it is received, and used to reproduce the voice. Since its introduction, this concept of low cost international calls via the Internet has captured market attention, and several competitors have entered the field, each using a proprietary encoding scheme which makes them incompatible. Without the appropriate software, it is impossible to reconstruct a voice message from the stream of E-mail received by the computer from the Internet.

The normal telephone network and the Internet are separate and distinct. A normal telephone call is sent on the telephone network as a telephone message, whereas an Internet phone call is sent via a modem as a form of electronic mail. Generally speaking, a normal telephone call is an analog signal in a loop terminating at the user's telephone, whereas an Internet phone call is a coded stream of E-mail. Although both are forms of communication, there is currently no integration of these systems, that is, a user cannot arrange a telephone conference call with an Internet phone call.

While in theory, integration of a regular telephone call and Internet call could be done by using a speakerphone placed in proximity to the microphone and speakers of the computer taking the Internet call, this solution is not practical. This is because the speakerphone does not fully pick up the sound from the computer, and also nearly all speakerphones only work in half duplex, such that only one person can speak at a time. This cannot be coordinated with an Internet call, especially since an Internet call may have a propagation delay of a few seconds between the spoken voice and the reception on the other end. This lack of a real time transfer complicates such conversations.

Therefore, it would be desirable to provide a means of fully integrating Internet and regular telephone conversations.

SUMMARY OF THE INVENTION

Accordingly, it is a principal object of the present invention to solve existing Internet-telephone integration problems and provide an Internet/telephone adaptor device to link a regular telephone call with an Internet call without requiring software that is specific to each proprietary encoding scheme.

In accordance with a preferred embodiment of the present invention, there is provided a data network/telephone adaptor device for linking a telephone circuit with a data network terminal having audio/data conversion means for reversibly converting voice signals to a data format for telephone-like voice communications over a data network, said adaptor device comprising:

telephone circuit means including isolation circuitry, for terminating a telephone line, and means for connecting said telephone circuit means to the audio/data conversion means to allow for simultaneous telephone conferencing between the telephone-like voice communications over the data network and voice communications over said telephone line.

In a preferred embodiment, the adaptor device is provided as an add-on accessory to existing computer terminals having a sound card, making them capable of handling Internet calls. The adaptor is connected both to the computer and to the telephone line, enabling linkage of regular and Internet calls.

With the adaptor device, a user can easily arrange conference calls between Internet users and telephone line users.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENT

Figure 1:
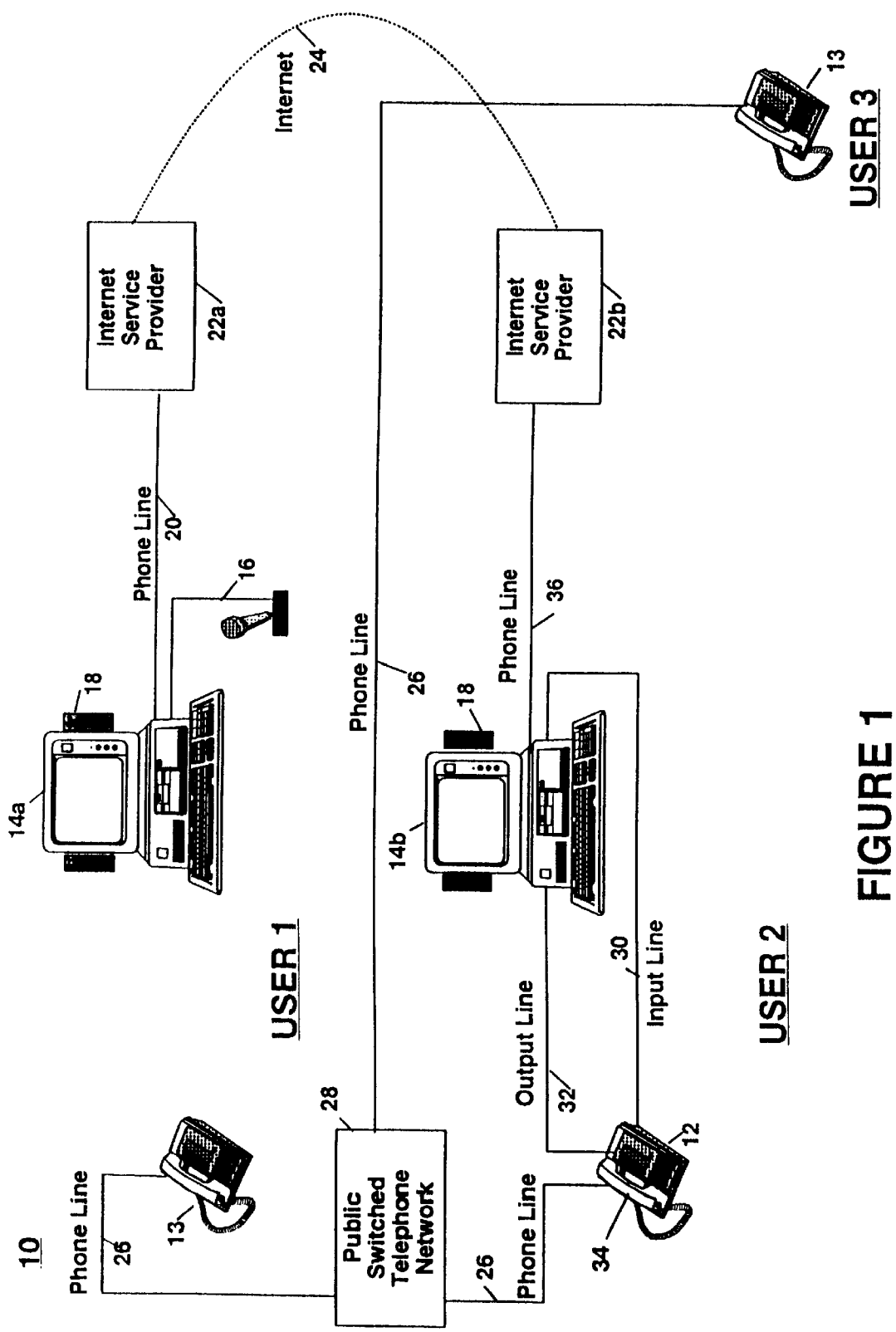
FIG. 1 illustrates the integration of data network and telephone line arrangements using an adaptor device constructed in accordance with the principles of the present invention.

Referring now to FIG. 1, there is shown a schematic block diagram of a multi-user environment 10 including a data network, such as the Internet, which has been integrated with a regular telephone line system. The integration is achieved via an Internet/telephone adaptor device 12 which links a regular telephone call with an Internet call without requiring software that is specific to each proprietary encoding scheme. Three different user arrangements are shown: the User 1 arrangement with a regular telephone 13 and a separate Internet Phone connection, the User 2 arrangement with an embodiment of the inventive Internet/telephone adaptor device 12, and the User 3 arrangement with a regular telephone 13.

The User 1 arrangement includes computer 14a which is equipped with a microphone 16 and speakers 18 for voice encoded data communications via Internet phone calls, and a phone line 20 for connection to the Internet service provider 22a. The connection via phone line 20 is such that when connected to service provider 22a, this line carries no pure voice signals. Internet service provider 22a allows User 1 to access the Internet 24. Separately, User 1 has a regular telephone 13 which is connected to phone line 26 for standard network connection to other telephone users via the Public Switched Telephone Network (PSTN) 28.

The User 2 arrangement is similar to that of User 1, with the addition of an embodiment of the inventive Internet/telephone adaptor device 12. The User 2 arrangement includes computer 14b which is connected via microphone input line 30 to device 12, speakers 18 providing audio output of computer sounds and Internet phone calls, and a line output 32 connected to device 12 to privately hear Internet phone calls, via handset microphone 34 of device 12. Computer 14a is connected via phone line 36 to Internet service provider 22b, and as with phone line 20, when connected to service provider 22b, no pure voice signals can be carried on this line. Internet service provider 22b allows User 2 access to the Internet 24. Device 12 is also connected to phone line 26 for connection to other phone users via PSTN 28.

The User 3 arrangement includes regular telephone 13 which is connected via phone to PSTN 28 only, allowing no Internet calls.

As can be understood by reference to the arrangements illustrated in FIG. 1, User 1 may communicate with User 2 either by way of the Internet 24 from his computer 14a, or via PSTN 28 using his regular telephone 13. He may only communicate with User 3 via PSTN 28 and his telephone 13. User 2 can however, communicate both with User 1 by voice-encoded data over Internet 24 via his computer 14b, and with User 3 via the PSTN 28, and this may be done simultaneously in a conference call among the three parties. Thus, using the inventive Internet/telephone adaptor device 12, User 2 has an integrated Internet and telephone system, enabling him to communicate with a variety of types of users, with increased communication options.

Figure 2:
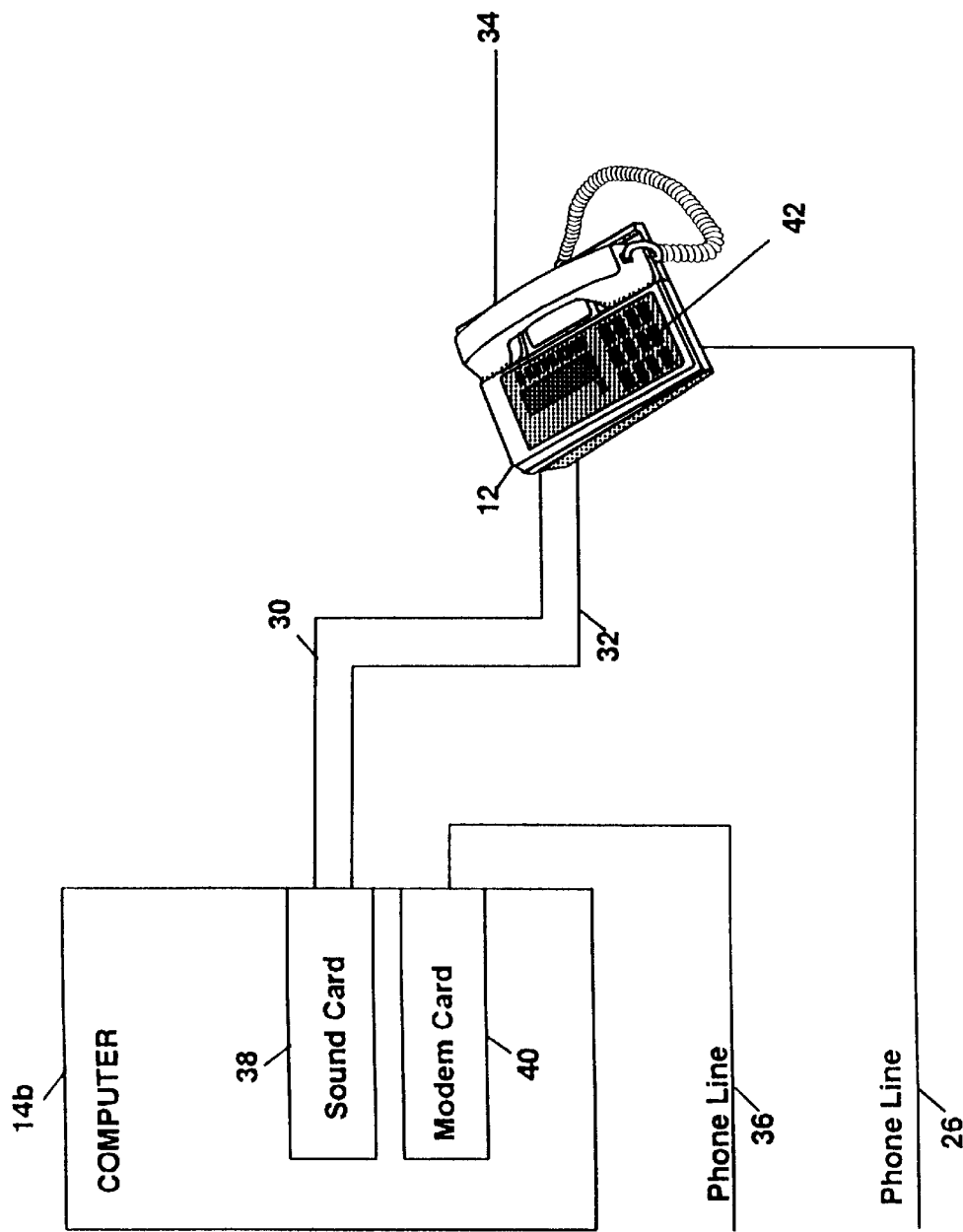
FIG. 2 illustrates a schematic layout of the adaptor device portion of the FIG. 1 data and telephone line arrangements.

Referring now to FIG. 2, there is illustrated a schematic layout of the Internet/telephone adaptor device 12 shown in the FIG. 1 data and telephone line arrangements. A sound card 38 installed inside a standard PC computer 14a has a microphone or input line 30 connected to device 12, as well as having the speaker or output line 32 connected to device 12. Computer 14a also contains a modem 40 which is connected via phone line 36 to the Internet service provider 22b. Regular telephone line 26 which carries telephone-like voice signals, is connected to device 12, and a headset or handset 34 connected to it allows the user to speak and hear. Device 12 may be configured in a telephone housing, and provided with dialing buttons 42 as in a conventional telephone design.

Figure 3:
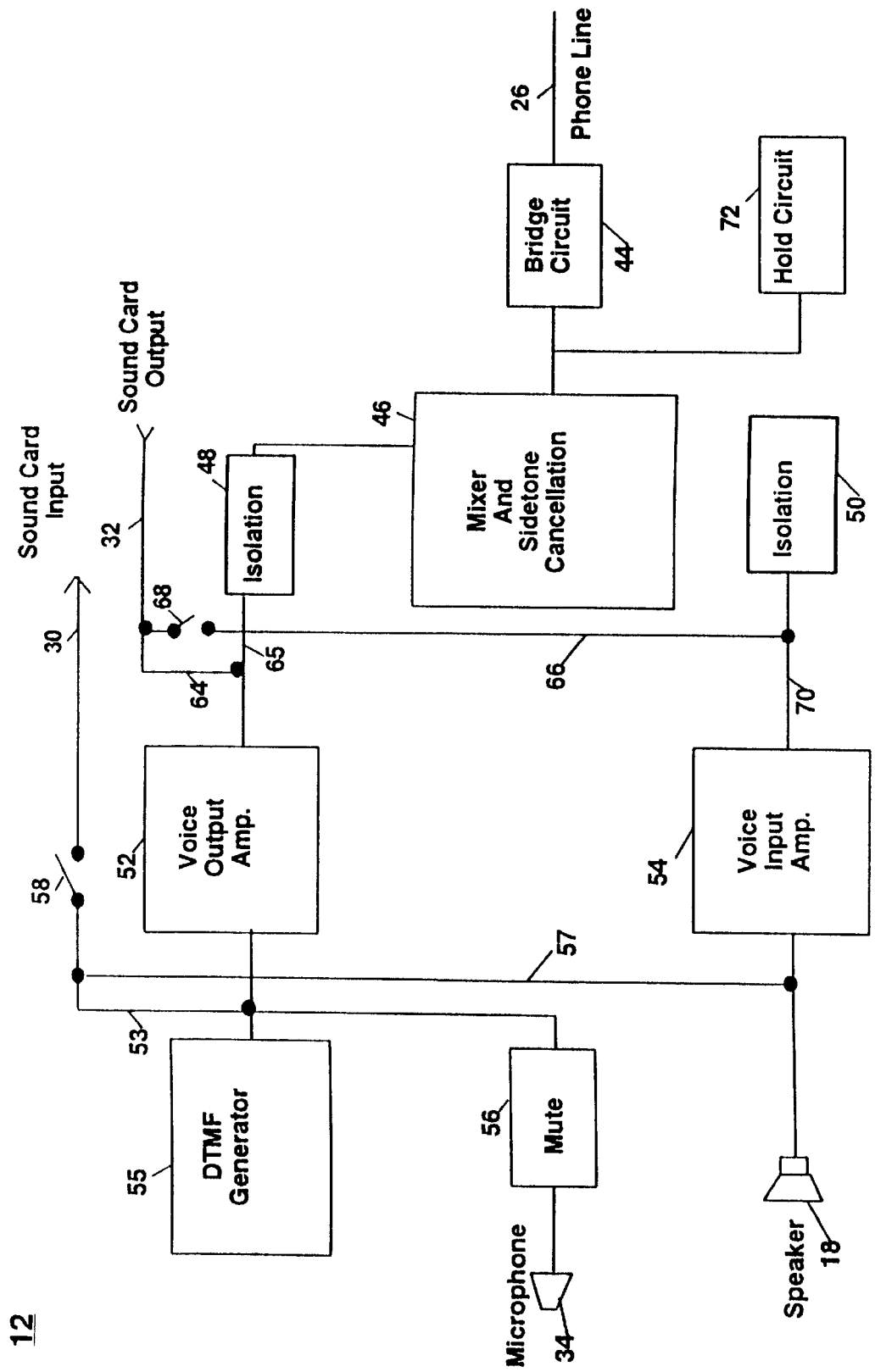
FIG. 3 illustrates an electronic schematic block diagram of the adaptor device of FIGS. 1 and 2.

Referring now to FIG. 3, there is shown a schematic block diagram of the Internet/telephone adaptor device 12. Adaptor device 12 can be implemented in accordance with FIG. 3 using skill of the art electronic design techniques applied to achieve the functions described. Device 12 comprises a bridge circuit 44, a mixer and sidetone cancellation circuit 46, a pair of isolation units 48,50 (such as Motorola MOC 8100), a voice output amplifier 52 (such as LM 358), and a voice input amplifier 54. In this fashion, two voice paths are provided, one for User 2's outgoing voice signals via voice output amplifier 52 output to the telephone line 26, and one for incoming voice signals from line 26 via voice input amplifier 54. A DTMF generator 55 (such as Philips PCD 3311) and muting circuit 56 complete the device 12.

Bridge circuit 44, together with circuit 46, terminates telephone line 26 with the appropriate impedance. Mixer and sidetone cancellation circuit 46 mixes the input and output speech and minimizes the sidetones generated, based on a type of circuit common in the art. The telephone line 26 is isolated from the computer circuits by isolation units 48,50, which consist of optoisolators or isolation transformers. User 2's outgoing voice signals from voice output amplifier 52 are fed to the telephone line 26, and the incoming voice signals from line 26 contain some feedback of the outgoing signal, specifically the sidetone component portion not defeated by cancellation circuit 46.

The incoming voice signal on line 26 is sent via voice input amplifier 54 to speaker 18, and is heard by User 2. If a conference call is to be arranged via the Internet, this input signal is also fed via a combination of circuit connection 57 and switch 58 if enabled, to the input line 30 of sound card 38 (see FIG. 2). Circuit connection 57 is representative of a combination of appropriate resistors and capacitors selected to block DC and allow only a limited portion of the signal to reach sound card 38. Switch 58 can be closed to allow the input signal to reach sound card 38, or opened to block the transfer.

When User 2 speaks into microphone 34, his voice signals are passed via mute circuit 56, used only during dialing, to both voice output amplifier 52 and, when switch 58 is closed, via circuit 53 to the sound card 38 input line 30. Feedback from microphone 34 to speaker 18 via circuit connections 53,57 is minimized through appropriate selection of attenuating resistors as well as by the use of a handset or headset for microphone 34, providing some acoustic separation. The sound card 38 input line 30 therefore receives both the incoming phone line signal as well as User 2's voice. These inputs are then transferred by the Internet "phone" software located in computer 14a to the distant Internet caller, enabling a conference call via adaptor device 12.

User 2 can simultaneously communicate via phone line 26, and his voice is transferred from voice output amplifier 52 together with the output of DTMF (Dual Tone Multi-Frequency) generator 55 via isolation unit 48 to the mixer circuit 46, where it is modulated and fed into telephone line 26 and sent to the caller on the other end.

When User 1 communicates with User 2 via a "phone" call on the Internet, the sound of his voice is received via the sound card 38 output line 32. This signal is passed onto the phone line 26 via connection 64 and 65 to isolation unit 48. Circuit connections 64,65 comprise appropriate resistors and capacitors to block DC when needed, and to control the amount of signal passed using appropriate impedances to limit feedback. The sound card 38 output line 32 is also fed via circuit connection 66, if switch 68 is closed, consisting of impedances and DC blocking components to circuit connection 70, which feeds voice input amplifier 54 to produce sounds heard by User 2 on speaker 18. Feedback from voice output amplifier 52 to voice input amplifier 54 is minimized through selection of appropriate attenuating resistors in circuit connections 64,66.

An additional circuit 72 can be provided to allow for User 2 to place a phone call he/she receives on "hold", so that either an Internet phone call or a regular telephone call can be placed on hold, while User 2 continues the conversation with another caller. In this fashion, the Internet/telephone adaptor device 12 enables a user to handle all conversations exactly as with a regular telephone, including standard "hold call" features.

While not specifically illustrated, it is to be understood that adaptor device 12 can also be designed to operate automatically under control of computer 14b so that outgoing calls may be automatically dialed and incoming calls may be automatically answered, with automatic procedures used to link the telephone lines and Internet once a connection is established.

In summary, the particular features of the inventive adaptor device 12 design which enable it to operate in the Internet environment are based on a novel configuration for handling multiple-type calls. Specifically, although an Internet "phone call" carries voice information, it is not a typical phone call, and is reconstructed as a phone call by the software. In transmission, it is sent neither as an analog message nor does it utilize any telephone protocols.

In addition, the circuit configuration, while appearing to create a direct feedback loop between the speaker 18 and microphone 34 via circuit connection 57, is designed with path impedances which maintain a low feedback level, while the inherent acoustic separation of handset or headset 34 from speaker 18 minimizes the acoustic feedback level. A second feedback loop, via circuit connections 64 and 66, is minimized by sidetone section of mixer 46, to eliminate problems.

Having described the invention with regard to certain specific embodiments thereof, it is to be understood that the description is not meant as a limitation, since further modifications will not become apparent to those skilled in the art, and it is intended to cover such modifications as fall within the scope of the appended claims.

We claim:

1. A data network/telephone adaptor device for simultaneous telephone conferencing among at least three parties,
    a first party having a telephone instrument at one end of a telephone line,
    a second party having a first data network terminal linked to the telephone line by the device, the first data network terminal including audio/data encoding means for reversibly encoding voice sounds as data for voice communications over a data network, and
    a third party having a second data network terminal including audio/data encoding means for reversibly encoding voice sounds as data for voice communications over the data network,
    said data network/telephone adaptor device comprising:
        telephone circuit means including isolation circuitry, for terminating the telephone line, and
        means for connecting said telephone circuit means to the audio/data encoding means of the first data network terminal to allow for simultaneous telephone conferencing among the first, second and third parties, wherein the second and third parties communicate via the voice-encoded data communications over the data network, and the first party communicates via voice communications over the telephone line with the second party, and in addition via the voice-encoded data communications over the data network with the third party.

2. The device of claim 1 wherein said telephone circuit means comprises standard telephone circuitry in a telephone instrument for connection to at least one telephone line, and said connecting means comprises line connections to portions of said telephone circuitry carrying voice signals, said line connections comprising feedback minimization circuitry.

3. The device of claim 2 wherein said feedback minimization circuitry comprises path impedances including attenuating resistors and capacitors arranged in circuit networks.

4. The device of claim 2 wherein said telephone instrument enables telephone conferencing by a user thereof together with said voice communications over said telephone line and the voice encoded data communications over the data network.

5. The device of claim 2 wherein said standard telephone circuitry comprises a telephone instrument having multi-line telephone connections.

6. The device of claim 5 wherein said multi-line telephone connections enable telephone conferencing between a user of said telephone instrument and at least one of said multi-line telephone connections together with the voice encoded data communications over the data network.

7. The device of claim 1 wherein the audio/data encoding means comprises a sound card in a computer for encoding voice signals as data signals for transmitting from said computer data network terminal via the data network.

8. The device of claim 1 further comprising telephone line hold circuitry for enabling either of said voice communications over said telephone line and the voice encoded data communications over the data network to be temporarily placed on hold.

9. A method of simultaneous telephone conferencing among at least three parties,
    a first party having a telephone instrument at one end of a telephone line,
    a second party having a first data network terminal linked to the telephone line by a data network/telephone adaptor device, the first data network terminal including audio/data encoding means for reversibly encoding voice sounds as data for voice communications over a data network, and
    a third party having a second data network terminal including audio/data encoding means for reversibly encoding voice sounds as data for voice communications over the data network, said method comprising the steps of:
        providing said data network/telephone adaptor device comprising telephone circuit means including isolation circuitry, for terminating the telephone line, and
        connecting said telephone circuit means to the audio/data encoding means of the first data network terminal to allow for simultaneous telephone conferencing among the first, second and third parties, wherein the second and third parties communicate via the voice-encoded data communications over the data network, and the first party communicates via voice communications over the telephone line with the second party, and in addition via the voice-encoded data communications over the data network with the third party.

10. The method of claim 9 wherein said telephone conferencing is performed in a telephone instrument having multi-line telephone connections.

11. The method of claim 10 wherein said multi-line telephone connections enable telephone conferencing between a user of said telephone instrument and at least one of said multi-line telephone connections together with the voice encoded data communications over the data network.

12. The method of claim 9 wherein the connecting step is performed by a sound card encoding voice signals as data signals for transmission from the data network terminal via the data network.

13. The method of claim 9 further comprising the step of temporarily placing on hold either of voice communications over said telephone line and the voice encoded data communications over the data network.

14. The method of claim 9 wherein said connecting step is performed automatically under control of said data network terminal provided as a computer.

* * * * *